United States Patent Office 2,759,010
Patented Aug. 14, 1956

2,759,010

ALKYLMERCAPTOALKYL-O,O-DIALKYLDITHIO-PHOSPHATE

Walter Lorenz, Wuppertal-Elberfeld, and Gerhard Schrader, Opladen, Germany, assignors to Farbenfabriken Bayer Aktiengesellschaft, Leverkusen, Germany, a corporation of Germany No Drawing. Application July 28, 1953, Serial No. 370,882

Claims priority, application Germany August 1, 1952

10 Claims. (Cl. 260—461)

The present invention relates to new esters of dithiophosphoric acid and to a method of making the same; more particularly it relates to compounds corresponding to the following general formula:

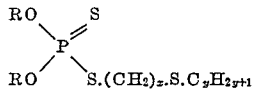

In this formula R stands for lower alkyl radicals and $x$ and $y$ for the integers 1 and 2.

The new compounds can be obtained by reacting O,O-dialkyl dithiophosphoric acid either as alkali metal salts or in the presence of acid-binding agents with compounds of the formula $$\text{hal.}(CH_2)_x.S.C_yH_{2y+1}$$

wherein $x$ and $y$ have the same meaning as above. The reaction is preferably carried out in a suitable solvent such as benzene or its homologues, ketones as e. g. acetone, methyl ethyl ketone, or alcohols; but also in aqueous medium the reaction may be effected. Also the reaction temperature may vary between about room temperature, slightly elevated temperatures and temperatures up to about 70 to 80° C.

The thus obtained new neutral esters of dithiophosphoric acid are mostly colorless water-insoluble oils and are distinguished by excellent contact-insecticidal and/or miticidal properties; they also exhibit a very high systemic effect when applied to living plants. The following table shows the properties of the new compounds:

TABLE I

| Compound | Effect | | | | Toxic effect on mice LD 100 |
|---|---|---|---|---|---|
| | On aphids | | On mites | | |
| | Concentration | Killed, percent | Concentration | Killed percent | |
| $CH_3S-C_2H_4-S-\overset{S}{\underset{\|}{P}}-(OC_2H_5)_2$ | 0.005 | 100 | 0.1-0.01 | 100 | 10 mg/kg. |
| $C_2H_5S-C_2H_4-S-\overset{S}{\underset{\|}{P}}-(OC_2H_5)_2$ | 0.005 | 100 | 0.1-0.01 | 100 | 50 mg/kg. |
| $C_2H_5S-CH_2-S-\overset{S}{\underset{\|}{P}}-(OCH_3)_2$ | 0.005 | 100 | 0.1-0.01 | 100 | 25 mg/kg. |
| $CH_3S-CH_2-S-\overset{S}{\underset{\|}{P}}-(OC_2H_5)_2$ | 0.005 | 100 | 0.1-0.01 | 100 | 10-20 mg/kg. |
| $C_2H_5S-CH_2-S-\overset{S}{\underset{\|}{P}}-(OC_2H_5)_2$ | 0.001 / 0.0005 | 100 / 100 | 0.0001-0.00005 | 100 | 10 mg/kg. |
| $C_2H_5S-CH_2-S-\overset{S}{\underset{\|}{P}}-(OC_3H_7n)_2$ | 0.005 | 100 | 0.1 | 100 | 1 g/kg. |
| $C_2H_5S-CH_2-S-\overset{S}{\underset{\|}{P}}-(OC_3H_7i)_2$ | 0.005 | 100 | 0.1 | Without effect | 1 g/kg., no effect. |

In comparison with compounds which contain, attached to the chain sulfur atom, a higher alkyl radical, i. e. in which $y$ of the above general formula is greater than 2, the new compounds show an unexpectedly increased insecticidal and/or miticidal effect that can be seen from the following table:

TABLE II

| Compound | Effect | | | | Toxic effect on mice, LD 100 |
|---|---|---|---|---|---|
| | On aphids | | On mites | | |
| | Concentration | Killed, percent | Concentration | Killed, percent | |
| $C_5H_{11}S-CH_2-\overset{S}{\underset{\|}{P}}-(OC_2H_5)_2$ | 0.1 | 60 | 0.1 | 100 | 500 mg./kg. |
| $C_4H_9S-CH_2-S-\overset{S}{\underset{\|}{P}}-(OC_2H_5)_2$ | 0.01 | 100 | 0.1 | 100 | 50 mg./kg. |

The following examples illustrate the present invention without, however, limiting it thereto:

Example 1

102 grams of O,O-diethyl dithiophosphoric acid are dissolved in 300 cc. of benzene and neutralized with 44 grams of pyridine under cooling. 55 grams of β-chloroethyl methyl sulfide are dropped thereto at 50–60° C. and the solution is thereafter heated for 2 hours at 75° C. After cooling the pyridine hydrochloride is removed by filtration, the benzene solution is washed with water and dried with anhydrous sodium sulfate. By fractionating 107 grams of O,O-diethyl-S-methylmercaptoethyl-dithiophosphate of B. P. 127–128° C. at 1.5 mm. are obtained as a colorless, water-insoluble oil of characteristic smell.

The new compound corresponds to the formula:

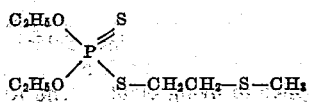

Example 2

112 grams (0.5 mol) of potassium O,O-diethyl dithiophosphate are dissolved in 400 cc. of ethyl alcohol. 55 grams (0.5 mol) of β-chloroethyl methyl sulfide are dropped thereto and the solution is stirred for 2 hours at 70–75° C. After cooling the salt is sucked off and the alcohol is distilled off. The remaining oil is dissolved in benzene and washed with water; after short drying with anhydrous sodium sulfate it is distilled. The ester boils at 1.5 mm. pressure at 127–128° C. (cf. Example 1); yield: 87 grams.

Example 3

102 grams of O,O-diethyl dithiophosphoric acid are dissolved in 300 cc. of benzene, to which 44 grams of pyridine are added under cooling. 64 grams of β-chloroethyl ethyl sulfide are dropped thereto at 70–75° C. and the process is further carried out as described in Example 1. 94 grams of O,O-diethyl-S-ethylmercaptoethyl-dithiophosphate of B. P. 132–133° C. at 1.5 mm. are obtained as a colorless, water-insoluble oil. The new compound corresponds to the formula:

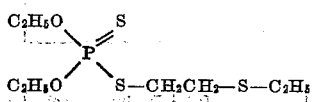

Example 4

112 grams (0.5 mol) of potassium O,O-diethyl dithiophosphate are dissolved in 400 cc. of ethyl alcohol. 64 grams (0.5 mol) of β-chloroethyl ethyl sulfide are dropped to this solution at 70° C. and heated for 2 hours at this temperature. After cooling the salt is sucked off, the solvent is distilled off, the residue is dissolved in benzene and washed with water. After drying with anhydrous sodium sulfate it is fractionated. 115 grams of O,O-diethyl-S-ethylmercaptoethyl-dithiophosphate of B. P. 132–133° C. at 1.5 mm. are obtained.

Example 5

67.5 grams of potassium O,O-diethyl dithiophosphate are dissolved in 200 cc. of acetone. 30 grams of chloromethyl methyl sulfide (cf. Annalen der Chemie 563, 62 [1949]) are dropped thereto at 20° C. The temperature slowly rises to 40° C. The solution is stirred for 2 hours at 50–55° C. and, after cooling, sucked off from the salts. After distilling off the solvent, the residue is dissolved in benzene, washed with water and dried with anhydrous sodium sulfate. By distilling 47 grams of O,O-diethyl-S-methylmercaptomethyl dithiophosphate of B. P. 113–114° C. at 1.5 mm. are obtained as a colorless, water-insoluble oil. The new compound corresponds to the formula:

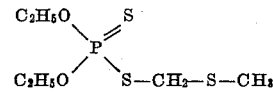

Example 6

224 grams (1 mol) of potassium O,O-diethyl dithiophosphate are suspended in 500 cc. of benzene. 110 grams (1 mol) of chloromethyl ethyl sulfide (cf. Berichte der Deutschen Chemischen Gesellschaft 69, 1612 [1936]) are dropped thereto at 50–60° C., and the mixture is heated for 3 hours at 70–75° C. After cooling, the sodium chloride is rendered filterable by adding about 100 cc. of water. The filtrate is fractionated. 215 grams of O,O-diethyl-S-ethylmercaptomethyl-dithiophosphate of B. P. 125–127° C. at 2 mm. are obtained as an almost colorless, water-insoluble oil. The new ester corresponds to the formula:

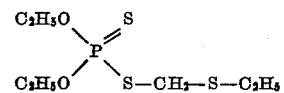

Example 7

98 grams of O,O-diethyl dithiophosphoric acid (95 per cent) are dropped to a suspension of 70 grams of potassium carbonate in 200 cc. of acetone at 20–30° C. Thereafter 55 grams of chloromethyl ethyl sulfide are dropped thereto. By cooling with water the temperature is kept at 35–40° C. for 2 hours. After cooling the salts are sucked off and the process is carried on as described in Example 2. 98 grams of O,O-diethyl-S-ethylmercaptomethyl-dithiophosphate of B. P. 125–127° C. at 2 mm. are obtained as a colorless, water-insoluble oil.

Example 8

98 grams of O,O-diethyl dithiophosphoric acid (95 per cent) are dissolved with 45 grams of sodium bicarbonate in 250 cc. of water. 55 grams of chloromethyl ethyl sulfide are dropped thereto at 20–25° C. The solution which has turned acid to Congo red paper, is rendered neutral again by adding some sodium bicarbonate and stirred for further 3 hours at 20–25° C. After this time the solution has become clear. The oil is dissolved in benzene and the process is further carried out as described in Example 1. 71 grams of O,O-diethyl-S-ethylmercaptomethyl-dithiophosphate of B. P. 128–129° C. at 2.5 mm. are obtained.

Example 9

220 grams of O,O-di-n-propyl dithiophosphoric acid are dissolved in 600 cc. of benzene and neutralized with 84 grams of pyridine under cooling. 111 grams of chloromethyl ethyl sulfide are dropped thereto at 70–75° C. and the solution is heated for 2 hours at 75° C. After cooling the pyridine hydrochloride is filtered off, the benzene solution is washed with water and dried with anhydrous sodium sulfate. By fractionating 249 grams of O,O-di-n-propyl-S-ethylmercaptomethyl-dithiophosphate of B. P. 132–133° C. at 1.5 mm. are obtained as a pale yellow, water-insoluble oil. The new ester corresponds to the formula:

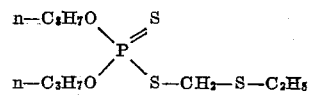

Example 10

220 grams of O,O-diisopropyl dithiophosphoric acid are dissolved in 600 cc. of benzene and neutralized with 84 grams of pyridine. 111 grams of chloromethyl ethyl sulfide are dropped thereto at 70–75° C. and the mixture is then heated for 2 hours at 75° C. After cooling the pyridine hydrochloride is sucked off, the benzene solution is washed with water and dried with anhydrous sodium sulfate. By fractionating 237 grams of O,O-diisopropyl-S- ethylmercaptomethyl-dithiophosphate of B. P. 126–128° C. at 2 mm. are obtained as a colorless, water-insoluble oil. The new compound corresponds to the formula:

$$\begin{array}{c} \text{iso-}C_3H_7O \\ \text{iso-}C_3H_7O \end{array} \!\!\! {>}\!\! P \!\! {<}\!\!\! \begin{array}{c} S \\ S\text{-}CH_2\text{-}S\text{-}C_2H_5 \end{array}$$

Example 11

84 grams of O,O-dimethyl dithiophosphoric acid (95 per cent) are dropped to a suspension of 70 grams of potassium carbonate in 200 cc. of acetone at 20–25° C. Thereafter 55 grams of chloromethyl ethyl sulfide are dropped thereto. The temperature slowly rises to 40° C. The solution is stirred over night at room temperature, the salts are then sucked off and the solvent is distilled off. The remaining oil is dissolved in benzene and washed with water. After short drying with anhydrous sodium sulfate, 70 grams of O,O-dimethyl-S-ethyl-mercaptomethyl-dithiophosphate of B. P. 114–116° C. at 1.5 mm. are obtained (under slight decomposition) by fractionating as a colorless, water-insoluble oil. The new ester corresponds to the formula:

$$\begin{array}{c} CH_3O \\ CH_3O \end{array} \!\!\! {>}\!\! P \!\! {<}\!\!\! \begin{array}{c} S \\ S\text{-}CH_2\text{-}S\text{-}C_2H_5 \end{array}$$

Example 12

84 grams of O,O-dimethyl dithiophosphoric acid are dissolved in 300 cc. of benzene and neutralized with 44 grams of pyridine. 65 grams of β-chloroethyl ethyl sulfide are dropped thereto at 70° C., and the solution is heated for 2 hours at 75° C. After cooling the process is further carried out as described in Example 1. By fractionating 77 grams of O,O-dimethyl-S-ethylmercapto-ethyl-dithiophosphate are obtained as a light-yellow, water-insoluble oil of B. P. 135–140° C. at 2.5 mm. The new compound corresponds to the formula:

$$\begin{array}{c} CH_3O \\ CH_3O \end{array} \!\!\! {>}\!\! P \!\! {<}\!\!\! \begin{array}{c} S \\ S\text{-}CH_2CH_2\text{-}S\text{-}C_2H_5 \end{array}$$

Example 13

Young apple trees being infested by green apple aphids are sprayed with an aqueous solution which contains besides wetting agents 0.001 per cent of O,O-diethyl-S-ethylmercaptomethyl dithiophosphate. It takes only a short time that the aphids begin to fall off. After 3–4 hours all aphids are killed. If after three days new aphids are applied to the apple trees, they begin to fall off after 2 hours. After 24 hours no more living aphids can be found. This result shows that the O,O-diethyl-S-ethylmercaptomethyl dithiophosphate possesses a systemic action.

Example 14

2 grams of O,O-diethyl-S-ethylmercaptomethyl dithiophosphate are ground together with 98 grams of talc. The powder obtained is uniformly dusted on potato plants which are infested by Colorado beetles and their larvae. It takes only a few hours that larvae as well as beetles are killed.

Example 15

50 grams of O,O-diethyl-S-ethylmercaptomethyl dithiophosphate are allowed to be absorbed by 50 grams charcoal. The powder obtained is thoroughly mixed. If cotton seed is coated with this mixture, the young cotton plants remain free from suctorial insects for about 2 months.

Example 16

An aqueous solution containing besides wetting agents 0.001–0.0005 per cent of O,O-diethyl-S-ethylmercaptomethyl dithiophosphate is sprayed on bean plants which are infested by red spider. The mites are killed after a short time, and the bean plants are protected against new attack by insect pests for several weeks.

We claim:

1. Esters of dithiophosphoric acid corresponding to the formula:

$$\begin{array}{c} RO \\ RO \end{array} \!\!\! {>}\!\! P \!\! {<}\!\!\! \begin{array}{c} S \\ S.(CH_2)_x.S.C_yH_{2y+1} \end{array}$$

wherein R stands for lower alkyl radicals and $x$ and $y$ are integers from 1 to 2, both inclusive.

2. Esters of dithiophosphoric acid corresponding to the formula:

$$\begin{array}{c} RO \\ RO \end{array} \!\!\! {>}\!\! P \!\! {<}\!\!\! \begin{array}{c} S \\ S.CH_2.S.C_yH_{2y+1} \end{array}$$

wherein R stands for lower alkyl radicals and $y$ for an integer from 1 to 2, both inclusive.

3. The ester of the formula:

$$\begin{array}{c} C_2H_5O \\ C_2H_5O \end{array} \!\!\! {>}\!\! P \!\! {<}\!\!\! \begin{array}{c} S \\ S.CH_2.S.C_2H_5 \end{array}$$

4. Process of making neutral esters of dithiophosphoric acid which comprises reacting O,O-dialkyl dithiophosphoric acid with $$hal.(CH_2)_x.S.C_yH_{2y+1}$$

in which formula $x$ and $y$ are integers from 1 to 2, both inclusive, in the presence of a solvent at temperatures between about room temperature and 70 to 80° C.

5. Process of making neutral esters of dithiophosphoric acid which comprises reacting O,O-dialkyl dithiophosphoric acid in the presence of an acid-binding agent and of a solvent with $$hal.(CH_2)_x.S.C_yH_{2y+1}$$

in which formula $x$ and $y$ are integers from 1 to 2, both inclusive, at temperatures between about room temperature and 70 to 80° C.

6. Process of making neutral esters of dithiophosphoric acid which comprises reacting an alkali metal salt of O,O-dialkyl dithiophosphoric acid with $$hal.(CH_2)_x.S.C_yH_{2y+1}$$

in which formula $x$ and $y$ are integers from 1 to 2, both inclusive, in the presence of a solvent at temperatures between about room temperature and 70 to 80° C.

7. Process of making O,O-diethyl-S-ethylmercaptomethyl-dithiophosphate which comprises reacting O,O-diethyl dithiophosphoric acid in the presence of an acid-binding agent and of a solvent with chloromethyl ethyl sulfide at temperatures between room temperature and about 70 to 80° C.

8. Process of making O,O-diethyl-S-ethylmercaptomethyl-dithiophosphate which comprises reacting an alkali metal salt of O,O-diethyl dithiophosphoric acid in the presence of a solvent with chloromethyl ethyl sulfide at temperatures between room temperature and about 70 to 80° C.

9. The ester of the formula:
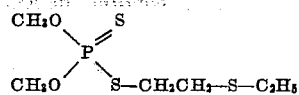
10. The ester of the formula:
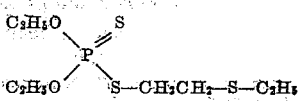
References Cited in the file of this patent
UNITED STATES PATENTS
| | | | |
|---|---|---|---|
| 2,494,126 | Hoegberg | | Jan. 10, 1950 |
| 2,494,284 | Cassaday et al. | | Jan. 10, 1950 |
| 2,571,989 | Schrader | | Oct. 16, 1951 |
| 2,586,655 | Hook | | Feb. 19, 1952 |
| 2,596,076 | Hook | | May 6, 1952 |
| 2,597,534 | Schrader | | May 20, 1952 |